US009229932B2

(12) United States Patent  
Adams et al.

(10) Patent No.: US 9,229,932 B2  
(45) Date of Patent: Jan. 5, 2016

(54) CONFORMED DIMENSIONAL DATA GRAVITY WELLS

(71) Applicant: INTERNATIONAL BUSINESS MACHINES CORPORATION, Armonk, NY (US)

(72) Inventors: Samuel S. Adams, Rutherfordton, NC (US); Robert R. Friedlander, Southbury, CT (US); James R. Kraemer, Santa Fe, NM (US); Jeb R. Linton, Manassas, VA (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 13/732,567

(22) Filed: Jan. 2, 2013

(65) Prior Publication Data

US 2014/0188960 A1     Jul. 3, 2014

(51) Int. Cl.
     *G06F 17/30*          (2006.01)
     *G06Q 30/00*          (2012.01)
     *G06Q 30/02*          (2012.01)

(52) U.S. Cl.
     CPC .......... *G06F 17/30* (2013.01); *G06F 17/30011* (2013.01); *G06F 17/30528* (2013.01); *G06Q 30/00* (2013.01); *G06Q 30/0201* (2013.01)

(58) Field of Classification Search
     CPC ............. G06F 17/30; G06F 17/30011; G06F 17/30528
     See application file for complete search history.

(56) References Cited

U.S. PATENT DOCUMENTS

| 5,450,535 | A | | 9/1995 | North |
| 5,664,179 | A | | 9/1997 | Tucker |
| 5,689,620 | A | | 11/1997 | Kopec et al. |
| 5,701,460 | A | | 12/1997 | Kaplan et al. |
| 5,943,663 | A | * | 8/1999 | Mouradian ..................... 706/45 |

(Continued)

FOREIGN PATENT DOCUMENTS

| EP | 1566752 A2 | 8/2005 |
| EP | 1843259 A2 | 10/2007 |

(Continued)

OTHER PUBLICATIONS

U.S. Appl. No. 13/609,710—Non-Final Office Action Mailed Jan. 27, 2014.

(Continued)

*Primary Examiner* — Chuong D Ngo
(74) *Attorney, Agent, or Firm* — John R. Pivnichny; Law Office of Jim Boice

(57) ABSTRACT

A processor-implemented method, system, and/or computer program product defines multiple dimensional data gravity wells on a conformed dimensional data gravity wells membrane. Non-dimensional data objects are associated with dimension objects to define conformed dimensional objects. The conformed dimensional objects are parsed into an n-tuple that includes a pointer to one of the non-dimensional data objects, a probability that a non-dimensional data object has been associated with a correct dimension object, and a weighting factor of importance of the conformed dimensional object. A virtual mass of each parsed conformed dimensional object is calculated, in order to define a shape of multiple dimensional data gravity wells that are created when conformed dimensional objects are pulled into each of the dimensional data gravity well frameworks on a conformed dimensional data gravity wells membrane.

20 Claims, 4 Drawing Sheets

(56) References Cited

U.S. PATENT DOCUMENTS

| | | |
|---|---|---|
| 5,974,427 A | 10/1999 | Reiter |
| 6,167,405 A | 12/2000 | Rosensteel et al. |
| 6,199,064 B1 | 3/2001 | Schindler |
| 6,269,365 B1 | 7/2001 | Kiyoki et al. |
| 6,275,833 B1 | 8/2001 | Nakamura et al. |
| 6,314,555 B1 | 11/2001 | Ndumu et al. |
| 6,353,818 B1 | 3/2002 | Carino, Jr. |
| 6,381,611 B1 | 4/2002 | Roberge et al. |
| 6,405,162 B1 | 6/2002 | Segond et al. |
| 6,424,969 B1 | 7/2002 | Gruenwald |
| 6,553,371 B2 | 4/2003 | Gutierrez-Rivas et al. |
| 6,633,868 B1 | 10/2003 | Min et al. |
| 6,735,593 B1 | 5/2004 | Williams |
| 6,768,986 B2 | 7/2004 | Cras et al. |
| 6,925,470 B1 | 8/2005 | Sangudi et al. |
| 6,990,480 B1 | 1/2006 | Burt |
| 7,019,740 B2 | 3/2006 | Georgalas |
| 7,047,253 B1 | 5/2006 | Murthy et al. |
| 7,058,628 B1 | 6/2006 | Page |
| 7,103,836 B1 | 9/2006 | Nakamura et al. |
| 7,152,070 B1 | 12/2006 | Musick et al. |
| 7,191,183 B1 | 3/2007 | Goldstein |
| 7,209,923 B1 | 4/2007 | Cooper |
| 7,337,174 B1 | 2/2008 | Craig |
| 7,441,264 B2 | 10/2008 | Himmel et al. |
| 7,493,253 B1 | 2/2009 | Ceusters et al. |
| 7,523,118 B2 | 4/2009 | Friedlander et al. |
| 7,523,123 B2 | 4/2009 | Yang et al. |
| 7,571,163 B2 | 8/2009 | Trask |
| 7,702,605 B2 | 4/2010 | Friedlander et al. |
| 7,748,036 B2 | 6/2010 | Speirs, III et al. |
| 7,752,154 B2 | 7/2010 | Friedlander et al. |
| 7,778,955 B2 | 8/2010 | Kuji |
| 7,783,586 B2 | 8/2010 | Friedlander et al. |
| 7,788,202 B2 | 8/2010 | Friedlander et al. |
| 7,788,203 B2 | 8/2010 | Friedlander et al. |
| 7,792,774 B2 | 9/2010 | Friedlander et al. |
| 7,792,776 B2 | 9/2010 | Friedlander et al. |
| 7,792,783 B2 | 9/2010 | Friedlander et al. |
| 7,797,319 B2 | 9/2010 | Piedmonte |
| 7,805,390 B2 | 9/2010 | Friedlander et al. |
| 7,805,391 B2 | 9/2010 | Friedlander et al. |
| 7,809,660 B2 | 10/2010 | Friedlander et al. |
| 7,853,611 B2 | 12/2010 | Friedlander et al. |
| 7,870,113 B2 | 1/2011 | Gruenwald |
| 7,877,682 B2 | 1/2011 | Aegerter |
| 7,925,610 B2 | 4/2011 | Elbaz et al. |
| 7,930,262 B2 | 4/2011 | Friedlander et al. |
| 7,940,959 B2 | 5/2011 | Rubenstein |
| 7,953,686 B2 | 5/2011 | Friedlander et al. |
| 7,970,759 B2 | 6/2011 | Friedlander et al. |
| 7,996,393 B1 | 8/2011 | Nanno et al. |
| 8,032,508 B2 | 10/2011 | Martinez et al. |
| 8,046,358 B2 | 10/2011 | Thattil |
| 8,055,603 B2 | 11/2011 | Angell et al. |
| 8,069,188 B2 | 11/2011 | Larson et al. |
| 8,086,614 B2 | 12/2011 | Novy |
| 8,095,726 B1 | 1/2012 | O'Connell et al. |
| 8,145,582 B2 | 3/2012 | Angell et al. |
| 8,150,882 B2 | 4/2012 | Meek et al. |
| 8,155,382 B2 | 4/2012 | Rubenstein |
| 8,199,982 B2 | 6/2012 | Fueyo et al. |
| 8,234,285 B1 | 7/2012 | Cohen |
| 8,250,581 B1 | 8/2012 | Blanding et al. |
| 8,341,626 B1 | 12/2012 | Gardner et al. |
| 8,447,273 B1 | 5/2013 | Friedlander et al. |
| 8,457,355 B2 | 6/2013 | Brown et al. |
| 8,620,958 B1 | 12/2013 | Adams et al. |
| 8,799,323 B2 | 8/2014 | Nevin, III |
| 8,849,907 B1 | 9/2014 | Hession et al. |
| 8,856,946 B2 * | 10/2014 | Adams et al. ............... 726/26 |
| 8,914,413 B2 * | 12/2014 | Adams et al. ............... 707/792 |
| 2001/0051881 A1 | 12/2001 | Filler |
| 2002/0091677 A1 | 7/2002 | Sridhar |
| 2002/0111792 A1 | 8/2002 | Cherny |
| 2002/0184401 A1 | 12/2002 | Kadel et al. |
| 2003/0065626 A1 | 4/2003 | Allen |
| 2003/0088576 A1 | 5/2003 | Hattori et al. |
| 2003/0149562 A1 | 8/2003 | Walther |
| 2003/0149934 A1 | 8/2003 | Worden |
| 2003/0212664 A1 | 11/2003 | Breining et al. |
| 2003/0212851 A1 | 11/2003 | Drescher et al. |
| 2004/0111410 A1 | 6/2004 | Burgoon et al. |
| 2004/0153461 A1 | 8/2004 | Brown et al. |
| 2004/0162838 A1 | 8/2004 | Murayama et al. |
| 2004/0249789 A1 | 12/2004 | Kapoor et al. |
| 2005/0050030 A1 | 3/2005 | Gudbjartsson et al. |
| 2005/0165866 A1 | 7/2005 | Bohannon et al. |
| 2005/0181350 A1 | 8/2005 | Benja-Athon |
| 2005/0188088 A1 | 8/2005 | Fellenstein et al. |
| 2005/0222890 A1 | 10/2005 | Cheng et al. |
| 2005/0273730 A1 | 12/2005 | Card et al. |
| 2006/0004851 A1 | 1/2006 | Gold et al. |
| 2006/0036568 A1 | 2/2006 | Moore et al. |
| 2006/0190195 A1 | 8/2006 | Watanabe et al. |
| 2006/0197762 A1 | 9/2006 | Smith et al. |
| 2006/0200253 A1 | 9/2006 | Hoffberg et al. |
| 2006/0256010 A1 | 11/2006 | Tanygin et al. |
| 2006/0271586 A1 | 11/2006 | Federighi et al. |
| 2006/0290697 A1 | 12/2006 | Madden et al. |
| 2007/0006321 A1 | 1/2007 | Bantz et al. |
| 2007/0016614 A1 | 1/2007 | Novy |
| 2007/0038651 A1 | 2/2007 | Bernstein et al. |
| 2007/0067343 A1 | 3/2007 | Mihaila et al. |
| 2007/0073734 A1 | 3/2007 | Doan et al. |
| 2007/0079356 A1 | 4/2007 | Grinstein |
| 2007/0088663 A1 | 4/2007 | Donahue |
| 2007/0130182 A1 | 6/2007 | Forney |
| 2007/0136048 A1 | 6/2007 | Richardson-Bunbury et al. |
| 2007/0174840 A1 | 7/2007 | Sharma et al. |
| 2007/0185850 A1 | 8/2007 | Walters et al. |
| 2007/0239710 A1 | 10/2007 | Jing et al. |
| 2007/0282916 A1 | 12/2007 | Albahari et al. |
| 2007/0300077 A1 | 12/2007 | Mani et al. |
| 2008/0065655 A1 | 3/2008 | Chakravarthy et al. |
| 2008/0066175 A1 | 3/2008 | Dillaway et al. |
| 2008/0086442 A1 | 4/2008 | Dasdan et al. |
| 2008/0091503 A1 | 4/2008 | Schirmer et al. |
| 2008/0133474 A1 | 6/2008 | Hsiao et al. |
| 2008/0159317 A1 | 7/2008 | Iselborn et al. |
| 2008/0172715 A1 | 7/2008 | Geiger et al. |
| 2008/0208813 A1 | 8/2008 | Friedlander et al. |
| 2008/0208838 A1 | 8/2008 | Friedlander et al. |
| 2008/0208901 A1 | 8/2008 | Friedlander et al. |
| 2008/0281801 A1 | 11/2008 | Larson et al. |
| 2008/0306926 A1 | 12/2008 | Friedlander et al. |
| 2009/0024553 A1 | 1/2009 | Angell et al. |
| 2009/0064300 A1 | 3/2009 | Bagepalli et al. |
| 2009/0080408 A1 | 3/2009 | Natoli et al. |
| 2009/0125546 A1 | 5/2009 | Iborra et al. |
| 2009/0144609 A1 | 6/2009 | Liang et al. |
| 2009/0164649 A1 | 6/2009 | Kawato |
| 2009/0165110 A1 | 6/2009 | Becker et al. |
| 2009/0177484 A1 | 7/2009 | Davis et al. |
| 2009/0287676 A1 | 11/2009 | Dasdan |
| 2009/0299988 A1 | 12/2009 | Hamilton, II et al. |
| 2009/0327632 A1 | 12/2009 | Glaizel et al. |
| 2010/0030780 A1 | 2/2010 | Eshghi et al. |
| 2010/0070640 A1 | 3/2010 | Allen et al. |
| 2010/0077033 A1 | 3/2010 | Lowry |
| 2010/0088322 A1 | 4/2010 | Chowdhury et al. |
| 2010/0131293 A1 | 5/2010 | Linthicum et al. |
| 2010/0169137 A1 | 7/2010 | Jastrebski et al. |
| 2010/0169758 A1 | 7/2010 | Thomsen |
| 2010/0174692 A1 | 7/2010 | Meyer et al. |
| 2010/0179933 A1 | 7/2010 | Bai et al. |
| 2010/0191743 A1 | 7/2010 | Perronnin et al. |
| 2010/0191747 A1 | 7/2010 | Ji et al. |
| 2010/0241644 A1 | 9/2010 | Jackson et al. |
| 2010/0257198 A1 | 10/2010 | Cohen et al. |
| 2010/0268747 A1 | 10/2010 | Kern et al. |
| 2010/0274785 A1 | 10/2010 | Procopiuc et al. |
| 2011/0040724 A1 | 2/2011 | Dircz |
| 2011/0066649 A1 | 3/2011 | Berlyant et al. |

(56) References Cited

U.S. PATENT DOCUMENTS

| | | |
|---|---|---|
| 2011/0077048 A1 | 3/2011 | Busch |
| 2011/0087678 A1 | 4/2011 | Frieden et al. |
| 2011/0093479 A1 | 4/2011 | Fuchs |
| 2011/0098056 A1 | 4/2011 | Rhoads et al. |
| 2011/0123087 A1 | 5/2011 | Nie et al. |
| 2011/0137882 A1 | 6/2011 | Weerasinghe |
| 2011/0194744 A1 | 8/2011 | Wang et al. |
| 2011/0208688 A1 | 8/2011 | Ivanov et al. |
| 2011/0246483 A1 | 10/2011 | Darr et al. |
| 2011/0246498 A1 | 10/2011 | Forster |
| 2011/0252045 A1 | 10/2011 | Garg et al. |
| 2011/0282888 A1 | 11/2011 | Koperski et al. |
| 2011/0299427 A1 | 12/2011 | Chu et al. |
| 2011/0301967 A1 | 12/2011 | Friedlander et al. |
| 2011/0314155 A1 | 12/2011 | Narayanaswamy et al. |
| 2012/0004891 A1 | 1/2012 | Rameau et al. |
| 2012/0005239 A1 | 1/2012 | Nevin, III |
| 2012/0016715 A1 | 1/2012 | Brown et al. |
| 2012/0023141 A1 | 1/2012 | Holster |
| 2012/0072468 A1 | 3/2012 | Anthony et al. |
| 2012/0079493 A1 | 3/2012 | Friedlander et al. |
| 2012/0109640 A1 | 5/2012 | Anisimovich et al. |
| 2012/0110004 A1 | 5/2012 | Meijer |
| 2012/0110016 A1 | 5/2012 | Phillips |
| 2012/0131139 A1 | 5/2012 | Siripurapu et al. |
| 2012/0131468 A1 | 5/2012 | Friedlander et al. |
| 2012/0166373 A1 | 6/2012 | Sweeney et al. |
| 2012/0191704 A1 | 7/2012 | Jones |
| 2012/0209858 A1 | 8/2012 | Lamba et al. |
| 2012/0221439 A1 | 8/2012 | Sundaresan et al. |
| 2012/0233194 A1 | 9/2012 | Ohyu et al. |
| 2012/0239761 A1 | 9/2012 | Linner et al. |
| 2012/0240080 A1 | 9/2012 | O'Malley |
| 2012/0246148 A1 | 9/2012 | Dror |
| 2012/0259841 A1 | 10/2012 | Hsiao et al. |
| 2012/0278897 A1 | 11/2012 | Ang et al. |
| 2012/0281830 A1 | 11/2012 | Stewart et al. |
| 2012/0290950 A1 | 11/2012 | Rapaport et al. |
| 2012/0297278 A1 | 11/2012 | Gattani et al. |
| 2012/0311587 A1 | 12/2012 | Li et al. |
| 2012/0316821 A1 | 12/2012 | Levermore et al. |
| 2012/0330958 A1 | 12/2012 | Xu et al. |
| 2013/0019084 A1 | 1/2013 | Orchard et al. |
| 2013/0031302 A1 | 1/2013 | Byom et al. |
| 2013/0060696 A1 | 3/2013 | Martin et al. |
| 2013/0103389 A1 | 4/2013 | Gattani et al. |
| 2013/0124564 A1 | 5/2013 | Oztekin et al. |
| 2013/0173292 A1 | 7/2013 | Friedlander et al. |
| 2013/0173585 A1 | 7/2013 | Friedlander et al. |
| 2013/0191392 A1 | 7/2013 | Kumar et al. |
| 2013/0238667 A1 | 9/2013 | Carvalho et al. |
| 2013/0246562 A1 | 9/2013 | Chong et al. |
| 2013/0254202 A1 | 9/2013 | Friedlander et al. |
| 2013/0291098 A1 | 10/2013 | Chung et al. |
| 2013/0311473 A1* | 11/2013 | Safovich et al. ............ 707/738 |
| 2013/0326412 A1* | 12/2013 | Treiser .......................... 715/810 |
| 2013/0339379 A1 | 12/2013 | Ferrari et al. |
| 2014/0006411 A1 | 1/2014 | Boldyrev et al. |
| 2014/0012884 A1 | 1/2014 | Bornea et al. |
| 2014/0025702 A1 | 1/2014 | Curtiss et al. |
| 2014/0074833 A1 | 3/2014 | Adams et al. |
| 2014/0074885 A1 | 3/2014 | Adams et al. |
| 2014/0074886 A1 | 3/2014 | Medelyan et al. |
| 2014/0074892 A1 | 3/2014 | Adams et al. |
| 2014/0081939 A1 | 3/2014 | Adams et al. |
| 2014/0184500 A1* | 7/2014 | Adams et al. ................. 345/157 |
| 2014/0188915 A1* | 7/2014 | Adams et al. ................. 707/755 |
| 2014/0214865 A1* | 7/2014 | Adams et al. ................. 707/755 |
| 2014/0214871 A1 | 7/2014 | Adams et al. |
| 2014/0250111 A1 | 9/2014 | Morton et al. |
| 2014/0344718 A1 | 11/2014 | Rapaport et al. |

FOREIGN PATENT DOCUMENTS

| | | |
|---|---|---|
| WO | 2006086179 A2 | 8/2006 |
| WO | 2007044763 A2 | 4/2007 |

OTHER PUBLICATIONS

U.S. Appl. No. 13/540,295—Non-Final Office Action Mailed Jan. 30, 2014.

U.S. Appl. No. 13/540,230—Non-Final Office Action Mailed Jan. 30, 2014.

U.S. Appl. No. 13/540,267—Non-Final Office Action Mailed Feb. 4, 2014.

U.S. Appl. No. 13/628,853—Notice of Allowance Mailed Mar. 4, 2014.

U.S. Appl. No. 13/595,356—Non-Final Office Action Mailed Apr. 14, 2014.

"Ninth New Collegiate Dictionary", Merriam-Webster Inc., 1991, p. 77 and 242.

"The American Heritage College Dictionary", Fourth Edition, Houghton Mifflin Company, 2004, p. 44 and 262.

U.S. Appl. No. 13/680,832—Non-Final Office Action Mailed Apr. 8, 2014.

U.S. Appl. No. 13/592,905—Notice of Allowance Mailed Oct. 25, 2013.

U.S. Appl. No. 13/342,406—Non-Final Office Action Mailed Sep. 27, 2013.

U.S. Appl. No. 13/610,347—Non-Final Office Action Mailed Jul. 19, 2013.

U.S. Appl. No. 13/610,347—Notice of Allowance Mailed Aug. 19, 2013.

M.J. Flynn, et al., "Sparse Distributed Memory Principles of Operation", Research Institute for Advanced Computer Science, 1989, pp. 1-60.

P. Kanerva, "Hyperdimensional Computing: An Introduction to Computing in Distributed Representation With High-Dimensional Random Vectors", Springer Science+Business Media, LLC, Cogn Comput, 1, 2009, pp. 139-159.

P. Kanerva, "What We Mean When We Say "What's the Dollar of Mexico?": Prototypes and Mapping in Concept Space", Quantum Informatics for Cognitive, Social, and Semantic Processes: Papers From the AAAI Fall Symposium, Association for the Advancement of Artificial Intelligence, 2010, pp. 2-6.

M. Yu, et al., "Secure and Robust Error Correction for Physical Unclonable Functions", Verifying Physical Trustworthiness of ICS and Systems, IEEE Design & Test of Computers, IEEE, Jan./Feb. 2010, pp. 48-64.

A. Jin, et al., "Biohashing: Two Factor Authentication Featuring Fingerprint Data and Tokenised Random Number," Pattern Recognition 37, Elsevier Ltd., 2004, pp. 2245-2255.

N. Saxena et al., "Data remanence effects on memory-based entropy collection for RFID systems", International Journal of Information Security 10.4 (2011), pp. 213-222.

A. Birrell et al., "A design for high-performance flash disks." ACM SIGOPS Operating Systems Review 41.2 (2007), pp. 88-93.

Richard Saling, "How to Give a Great Presentation! From the HP Learning Center", Jul. 28, 2008, <http://rsaling.wordpress.com/2008/07/28/how-to-give-a-great-presentation/>, pp. 1-28.

K. Matterhorn, "How to Share Data Between a Host Computer & Virtual Machine," eHow, pp. 1-3, <http://www.ehow.com/how_7385388_share-host-computer-virtual-machine.html>, Retrieved Feb. 17, 2013.

W. Caid et al., "Context Vector-Based Text Retrieval", Fair Isaac Corporation, Aug. 2003, pp. 1-20.

Anonymous "Fraud Detection Using Data Analytics in the Banking Industry," ACL Services Ltd., 2010, pp. 1-9 <http://www.acl_com/pdfs/DP_Fraud_detection_BANKING.pdf>.

Visual Paradigm, "DB Visual Architect 4.0 Designer'S Guide: Chapter 6—Mapping Object Model to Data Model and Vice Versa", 2007, pp. 6-2-6-26.

J. Cheng et al., "Context-Aware Object Connection Discovery in Large Graphs", Data Engineering, 2009. ICDE '09. IEEE 25th International Conference on, pp. 856-867.

(56) References Cited

OTHER PUBLICATIONS

R. Angles et al., "Survey of Graph Database Models", ACM Computing Surveys, vol. 40, No. 1, Article 1, Feb. 2008, pp. 1-65.
U.S. Appl. No. 13/592,905—Non-Final Office Action Mailed May 8, 2013.
U.S. Appl. No. 13/628,853—Non-Final Office Action Mailed Nov. 7, 2013.
U.S. Appl. No. 13/342,406—Notice of Allowance Mailed Mar. 20, 2014.
U.S. Appl. No. 13/732,517—Specification Filed Jan. 2, 2013.
U.S. Appl. No. 13/733,052—Specification Filed Jan. 2, 2013.
U.S. Appl. No. 13/733,066—Specification Filed Jan. 2, 2013.
U.S. Appl. No. 13/755,623—Notice of Allowance Mailed May 27, 2014.
S. Alam et al., "Interoperability of Security-Enabled Internet of Things", Springer, Wireless Personal Communications, Dec. 2011, vol. 61, pp. 567-586.
U.S. Appl. No. 13/648,801—Non-Final Office Action Mailed Jul. 1, 2014.
U.S. Appl. No. 13/609,710—Final Office Action Mailed Jul. 24, 2014.
U.S. Appl. No. 13/733,052—Non-Final Office Action mailed Sep. 18, 2014.
U.S. Appl. No. 13/861,058—Non-Final Office Action mailed Dec. 11, 2014.
Faulkner, Paul, "Common Patterns for Synthetic Events in Websphere Business Events," Jan. 15, 2011, http://www.ibm.com/developerworks/websphere/bpmjournal/1101_faulkner2/1101_faulkner2.html, pp. 1-6.
Evaggelio Pitoura et al., "Context in Databases", University of Ioannina, Greece, 2004, pp. 1-19.
Avinash Kaushik, "End of Dumb Tables in Web Analytics Tools! Hello: Weighted Sort", Sep. 7, 2010, www.kaushik.net, pp. 1-15.
Lorenzo Alberton, "Graphs in the Database: SQL Meets Social Networks," Techportal, Sep. 7, 2009, http://techportal.inviqa.com/2009/09/07/graphs-in-the-database-sql-meets-social-networks/, pp. 1-11.
U.S. Appl. No. 13/755,987—Non-Final Office Action mailed Jan. 1, 2015.
U.S. Appl. No. 13/648,801—Final Office Action mailed Jan. 13, 2015.
G. Begelman et al., "Automated Tag Clustering: Improving Search and Exploration in the TagSpace", Collaborative Tagging Workshop, WWW2006, Edinburgh, Scotland, May 2006, pp. 1-29.
U.S. Appl. No. 13/621,931—Non-Final Office Action mailed Jan. 28, 2015.
S. Ceri et al., "Model-Driven Development of Context-Aware Web Applications", ACM, ACM Transactions on Internet Technology, 2007, (Abstract Only).
U.S. Appl. No. 14/078,135—Notice of Allowance mailed Feb. 24, 2015.
U.S. Appl. No. 13/756,051—Notice of Allowance mailed Feb. 27, 2015.
L. Du et al., "A Unified Object-Oriented Toolkit for Discrete Contextual Computer Vision", IEEE, IEEE Colloquium on Pattern Recognition, Feb. 1997, pp. 3/1-3/5. (Abstract Only).
U.S. Appl. No. 13/610,523—Non-Final Office Action mailed Apr. 30, 2015.
U.S. Appl. No. 13/540,267—Non-Final Office Action mailed Jun. 4, 2015.
U.S. Appl. No. 13/609,710—Examiner's Answer mailed Jun. 9, 2015.
U.S. Appl. No. 13/780,779—Non-Final Office Action mailed Apr. 3, 2015.
U.S. Appl. No. 13/896,461—Non-Final Office Action mailed Apr. 21, 2015.
U.S. Appl. No. 13/569,366—Non-Final Office Action mailed Jun. 30, 2015.

* cited by examiner

CONFORMED DIMENSIONAL DATA GRAVITY WELLS

BACKGROUND

The present disclosure relates to the field of computers, and specifically to the use of computers in managing data. Still more particularly, the present disclosure relates to sorting and categorizing data.

Data are values of variables, which typically belong to a set of items. Examples of data include numbers and characters, which may describe a quantity or quality of a subject. Other data can be processed to generate a picture or other depiction of the subject. Data management is the development and execution of architectures, policies, practices and procedures that manage the data lifecycle needs of an enterprise. Examples of data management include storing data in a manner that allows for efficient future data retrieval of the stored data.

SUMMARY

A processor-implemented method, system, and/or computer program product defines multiple dimensional data gravity wells on a conformed dimensional data gravity wells membrane. Non-dimensional data objects are associated with dimension objects to define conformed dimensional objects. The conformed dimensional objects are parsed into an n-tuple that includes a pointer to one of the non-dimensional data objects, a probability that a non-dimensional data object has been associated with a correct dimension object, and a weighting factor of importance of the conformed dimensional object. A virtual mass of each parsed conformed dimensional object is calculated, in order to define a shape of multiple dimensional data gravity wells that are created when conformed dimensional objects are pulled into each of the dimensional data gravity well frameworks on a conformed dimensional data gravity wells membrane.

DETAILED DESCRIPTION

Figure 1:
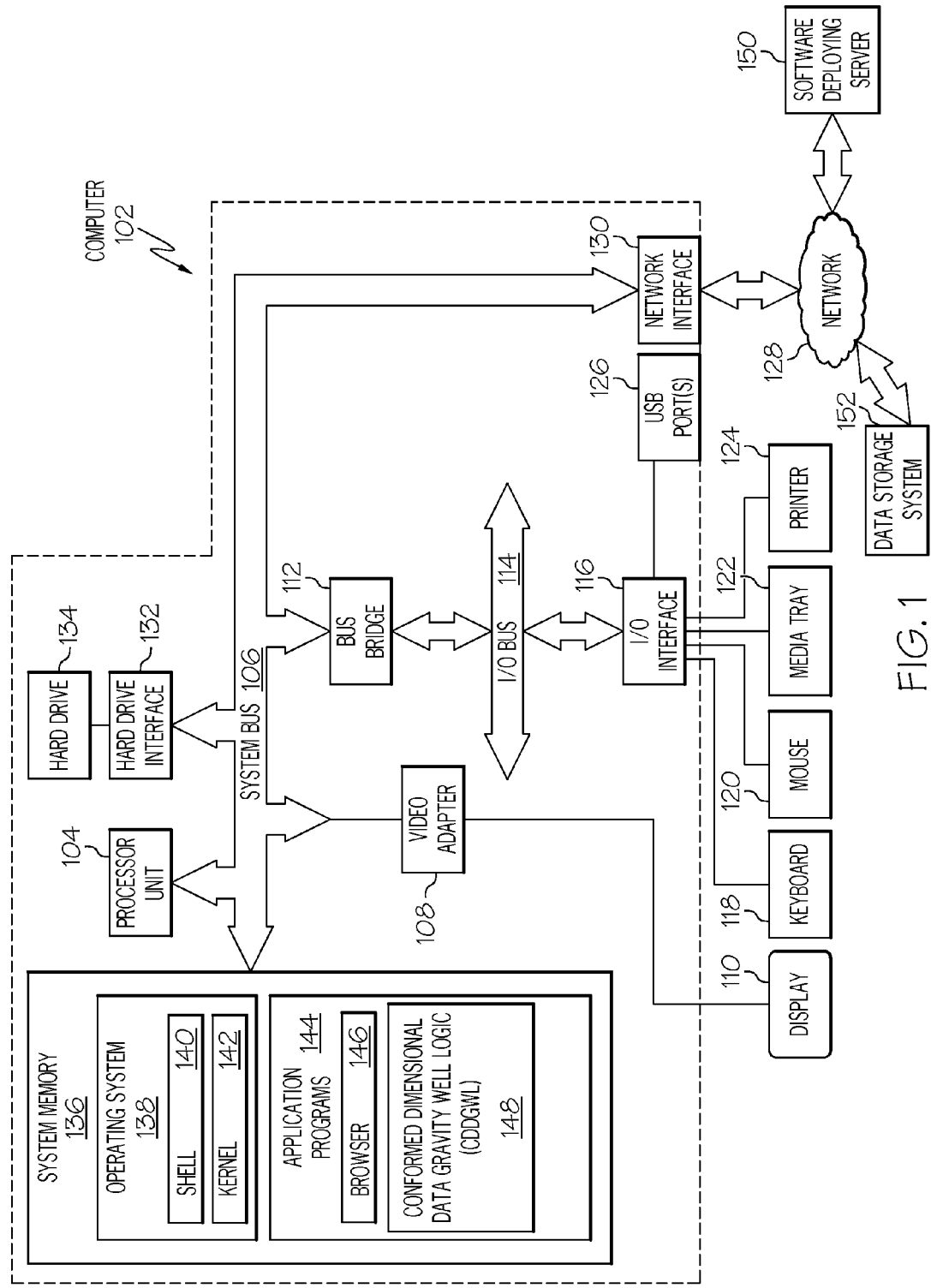
FIG. 1 depicts an exemplary system and network in which the present disclosure may be implemented.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary system and network that may be utilized by and/or in the implementation of the present invention. Note that some or all of the exemplary architecture, including both depicted hardware and software, shown for and within computer 102 may be utilized by software deploying server 150.

Exemplary computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multimedia interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150, using a network interface 130. Network interface 130 is a hardware network interface, such as a network interface card (NIC), etc. Network 128 may be an external network such as the Internet, or an internal network such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Figure 3:
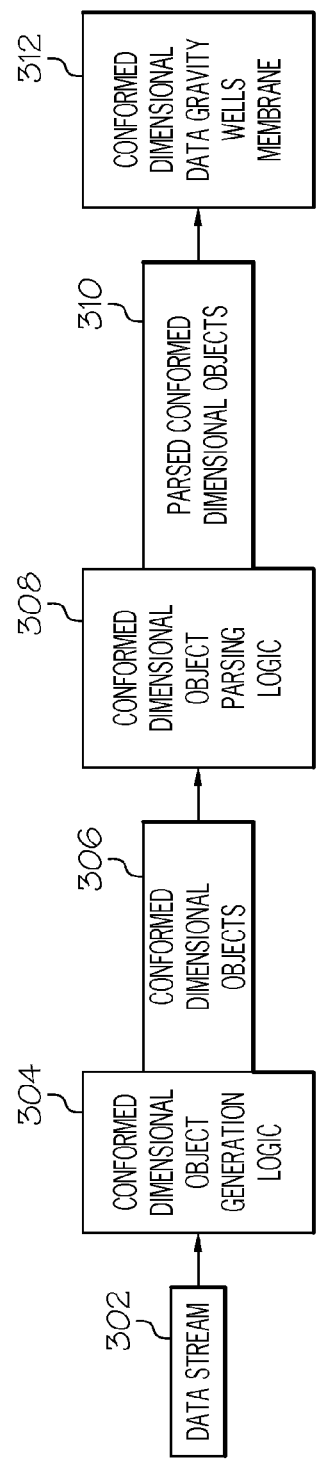
FIG. 3 illustrates a process of preparing a data stream for transmission to a dimensional data gravity wells membrane.
Figure 4:
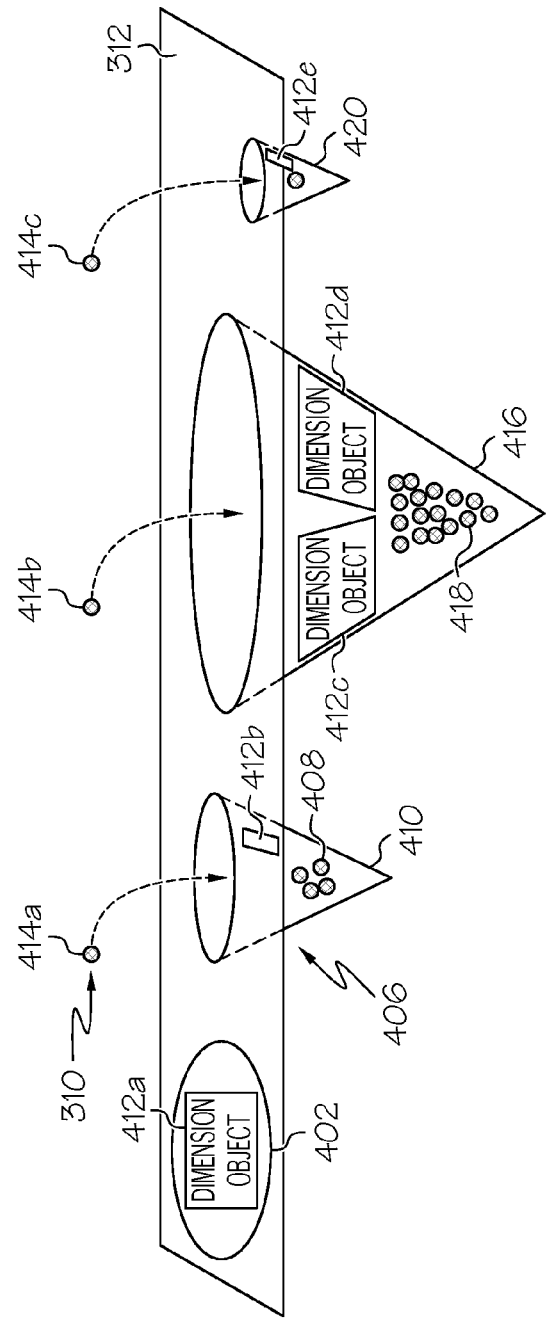
FIG. 4 depicts parsed synthetic dimension objects being selectively pulled into dimensional data gravity well frameworks in order to define dimensional data gravity wells.

Application programs 144 in computer 102's system memory (as well as software deploying server 150's system memory) also include a conformed dimensional data gravity well logic (CDDGWL) 148. CDDGWL 148 includes code for implementing the processes described below, including those described in FIGS. 2-5, and/or for creating the data gravity wells, membranes, etc. that are depicted in FIGS. 3-4. In one embodiment, computer 102 is able to download CDDGWL 148 from software deploying server 150, including in an on-demand basis, wherein the code in CDDGWL 148 is not downloaded until needed for execution. Note further that, in one embodiment of the present invention, software deploying server 150 performs all of the functions associated with the present invention (including execution of CDDGWL 148), thus freeing computer 102 from having to use its own internal computing resources to execute CDDGWL 148.

Note that the hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
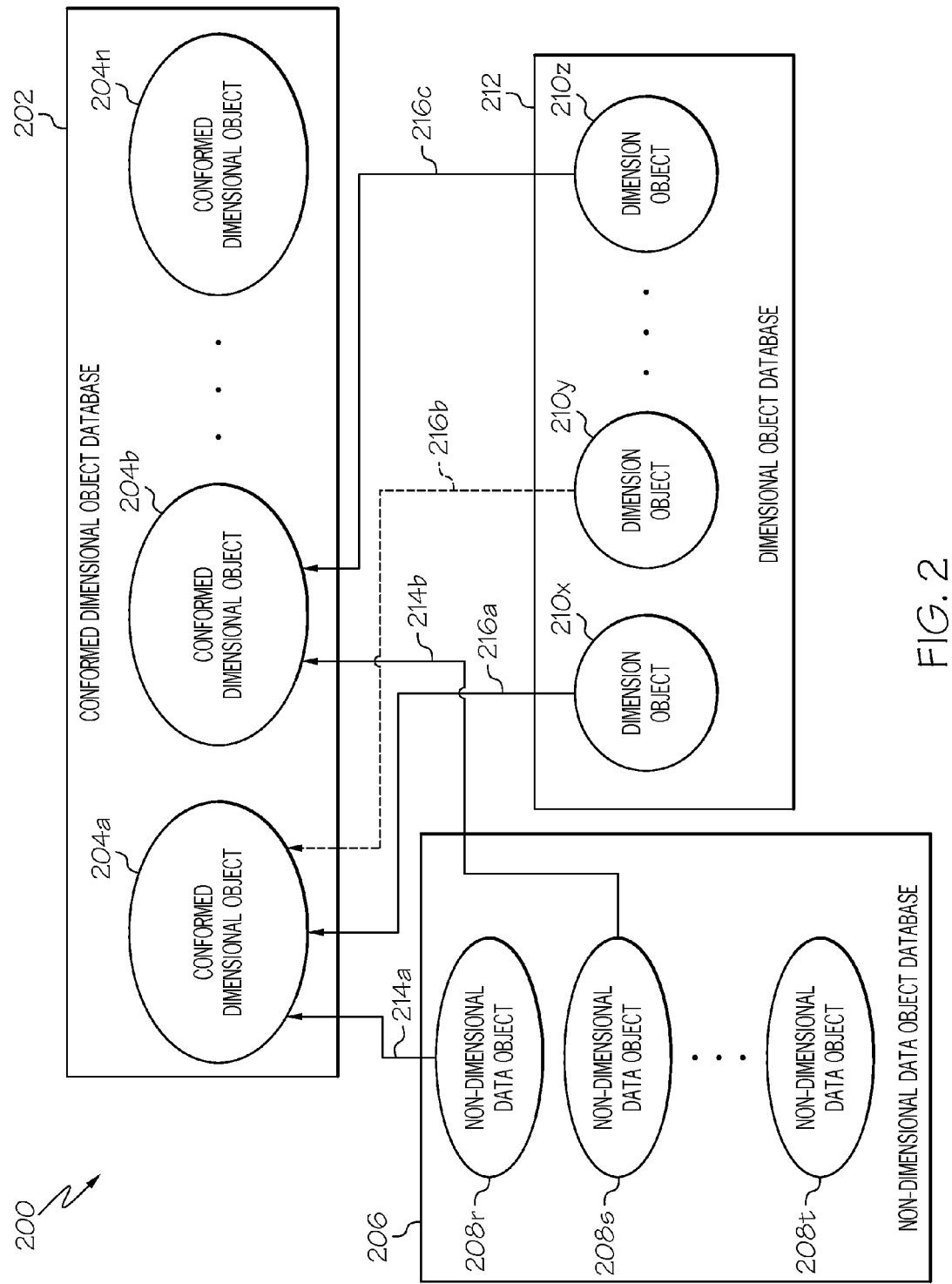
FIG. 2 illustrates a process for generating one or more conformed dimensional objects.

With reference now to FIG. 2, a process for generating one or more conformed dimensional objects in a system 200 is presented. Note that system 200 is a processing and storage logic found in computer 102 and/or data storage system 152 shown in FIG. 1, which process, support, and/or contain the databases, pointers, and objects depicted in FIG. 2.

Within system 200 is a conformed dimensional object database 202, which contains multiple conformed dimensional objects 204a-204n (thus indicating an "n" quantity of objects, where "n" is an integer). Each of the conformed dimensional objects 204a-204n is defined by at least one non-dimensional data object and at least one dimension object. That is, at least one non-dimensional data object is associated with at least one dimension object to define one or more of the conformed dimensional objects 204a-204n. The non-dimensional data object is merely a value/number, and has no dimensions (e.g., meters, product units, kilograms, etc.).

For example, assume that a non-dimensional data object database 206 includes multiple non-dimensional data objects 208r-208t (thus indicating a "t" quantity of objects, where "t" is an integer). However, data within each of these non-dimensional data objects 208r-208t by itself is meaningless, since it has no dimensions. That is, the data within each of the non-dimensional data objects 208r-208t is data that, standing alone, has no meaning, since it could be describing a number of inches, a number of feet, a number of meters, etc. (i.e., it is dimensional-less). In order to give the data within each of the non-dimensional data objects 208r-208t dimensional meaning, they are given dimension, which is provided by data contained within one or more of the dimensional objects 210x-210z (thus indicating a "z" quantity of dimensional objects, where "z" is an integer) stored within a dimensional object database 212. For example, if a pointer 214a points the non-dimensional data object 208r to the conformed dimensional object 204a, while a pointer 216a points the dimension object 210x to the conformed dimensional object 204a, thus associating the non-dimensional data object 208r and the dimension object 210x with the conformed dimensional object 204a (e.g., storing or otherwise associating the data within the non-dimensional data object 208r and the dimension object 210x in the conformed dimensional object 204a), the data within the non-dimensional data object 208r now has been given a label/dimension. This dimensional label/meaning is thus stored within (or otherwise associated with) the conformed dimensional object 204a.

Similarly, if a pointer 214b associates data within the non-dimensional data object 208s with the conformed dimensional object 204b, while the pointer 216c associates data within the dimension object 210z with the conformed dimensional object 204b, then the data within the non-dimensional data object 208s is now given a dimension/label by the data in the dimension object 210z. This dimensional meaning is thus stored within (or otherwise associated with) the conformed dimensional object 204b.

Note that more than one dimension object can give meaning to a particular non-dimensional data object. For example, both dimension object 210x and dimension object 210y can point to the conformed dimensional object 204a, thus providing compound dimensional meaning to the non-dimensional data object 208r shown in FIG. 2. This compound dimensional meaning provides various layers of dimension (e.g., weight and source; store location and price; etc.) to the data in the non-dimensional data object 208r.

Note also that while the pointers 214a-214b and 216a-216c are logically shown pointing toward one or more of the conformed dimensional objects 204a-204n, in one embodiment the conformed dimensional objects 204a-204n actually point to the non-dimensional data objects 208r-208t and the dimension objects 210x-210z. That is, in one embodiment the conformed dimensional objects 204a-204n locate the non-dimensional data objects 208r-208t and the dimension objects 210x-210z through the use of the pointers 214a-214b and 216a-216c.

With reference now to FIG. 3, a process of preparing a data stream for transmission to a dimensional data gravity wells membrane is presented. A data stream 302 is initially received. For example, assume that an enterprise is tracking sales at a particular store. In this example, the data stream 302 may be real-time data that describes what products are being sold, their price, their profit margin, the store location, etc. In one embodiment, however, the data stream 302 only includes "raw" data, which has no dimensional meaning In order to give this raw data dimensional meaning, the raw data (i.e., non-dimensional data objects) are associated with one or more dimension objects, as described above in FIG. 2, through the use of a conformed dimensional object generation logic 304 (i.e., part of CDDGWL 148 depicted in FIG. 1). Conformed dimensional object generation logic 304 thus converts the data stream 302 into conformed dimensional objects 306 (e.g., the conformed dimensional objects 204a-n located in conformed dimensional object database 202 in FIG. 2).

In order to properly utilize the conformed dimensional objects 306, a conformed dimensional object parsing logic 308 parses the conformed dimensional objects 306 into parsed conformed dimensional objects 310. These parsed conformed dimensional objects 310 make up an n-tuple (i.e., an ordered list of "n" descriptive elements (where "n" is an integer)) that describe each of the conformed dimensional objects 306. In one embodiment, this n-tuple includes a pointer (e.g., a locating pathway) to the non-dimensional data object in the synthetic dimension object. This pointer may be to a storage location (e.g., a universal resource locator (URL) address at which the non-dimensional data object is stored), such that the conformed dimensional objects 306 must be generated, or the pointer may be local (such that the conformed dimensional objects 306 exist locally as part of a streaming data packet, etc.). In one embodiment, the n-tuple also includes a probability value that a non-dimensional data object has been associated with a correct dimension object. That is, a correct dimension object may or may not be associated with a particular non-dimensional data object. For example, the non-dimensional data object may be incomplete (i.e., a fragment, a corrupted version, etc.) version of the actual non-dimensional data. As such, a "guess" must be made to determine which dimension data should be associated with that corrupted non-dimensional data. In this example, assume that the corrupted non-dimensional data object contains the value "3.13", and that the data is related to areas of circles. If the value of the non-dimensional data object had been "3.14159", then there is a high probability (e.g., is predetermined to have a 99% probability) that this data object is the ratio of a circle's area divided by that circle's radius-squared (i.e., is "pi"). However, a predetermination may be made, based on probability calculations such as those using a Bayesian probability formula, that the likelihood of "3.13" being the ratio of a circle's area divided by that circle's radius-squared is only 85%.

In one embodiment, one of the parameters/values from the n-tuple is a weighting factor of importance of the conformed dimensional object. In one embodiment, this weighting factor is how "important" this particular conformed dimensional object is to an enterprise's project. For example, assume that an enterprise project is to track sales of a particular product at a particular store. If the conformed dimensional object contains information regarding how many units of this particular product have been sold at this store during a particular time period, then this conformed dimensional object is given (either manually or by an algorithm) an "importance" rating of 95 out of 100. However, if the conformed dimensional object describes whether the items are being paid for with cash or credit cards, such information is deemed less important (e.g., is given an "importance" rating of 30 out of 100). Note that an algorithm to determine (and/or predetermine) these importance ratings can utilize flags, metadata, etc. to determine the importance of the conformed dimensional objects. For example, assume that a particular conformed dimensional object has a flag indicating that it describes a quantity of products sold at a particular store on a particular day. Assume further that a software program for an enterprise project to track such products also has this flag. Thus, if the two flags match, then a high level of importance (e.g., over 95 on a scale of 100) is assigned to conformed dimensional objects that have this flag.

The parsed conformed dimensional objects 310 are then sent to a conformed dimensional data gravity wells membrane 312. The conformed dimensional data gravity wells membrane 312 is a virtual mathematical membrane that is capable of supporting multiple dimensional data gravity wells. That is, the conformed dimensional data gravity wells membrane 312 is a mathematical framework that is part of a program such as CDDGWL 148 shown in FIG. 1. This mathematical framework is able to 1) provide a virtual environment in which the multiple dimensional data gravity wells exist; 2) populate the multiple dimensional data gravity wells with appropriate conformed dimensional objects (e.g., those conformed dimensional objects having non-dimensional data objects and dimension objects that match those found in the structure of a particular dimensional data gravity well); and 3) support the visualization/display of the dimensional data gravity wells on a display.

For example, consider FIG. 4, which depicts parsed conformed dimensional objects 310 being selectively pulled into dimensional data gravity well frameworks in order to define dimensional data gravity wells. Conformed dimensional data gravity wells membrane 312 supports multiple conformed dimensional data gravity well frameworks. For example, consider conformed dimensional data gravity well framework 402. A conformed dimensional data gravity well framework is defined as a construct that includes the capability of pulling data objects from a streaming data flow, such as parsed conformed dimensional objects 310, and storing same if a particular parsed conformed dimensional object contains a particular dimension object 412a (where dimension object 412a is defined above). Note that conformed dimensional data gravity well framework 402 is not yet populated with any parsed conformed dimensional objects, and thus is not yet a conformed dimensional data gravity well. However, conformed dimensional data gravity well framework 406 is populated with parsed conformed dimensional objects 408, and thus has been transformed into a conformed dimensional data gravity well 410. This transformation occurred when conformed dimensional data gravity well framework 406, which contains (i.e., logically includes and/or points to) a dimension object 412b, which is part of each of the conformed dimensional objects 408 such as parsed conformed dimensional object 414a, are populated with one or more parsed conformed dimensional objects.

Note that parsed conformed dimensional objects 310, including parsed conformed dimensional objects 414a-414c, are streaming in real-time from a data source across the conformed dimensional data gravity wells membrane 312. If a particular parsed conformed dimensional object is never pulled into any of the conformed dimensional data gravity wells on the conformed dimensional data gravity wells membrane 312, then that particular parsed conformed dimensional object simply continues to stream to another destination, and does not affect the size and/or location of any of the conformed dimensional data gravity wells.

Consider now conformed dimensional data gravity well 416. Note that conformed dimensional data gravity well 416 includes two dimension objects 412c-412d. The presence of dimension objects 412c-412d (which in one embodiment are graphically depicted on the walls of the conformed dimensional data gravity well 416) causes conformed dimensional objects such as parsed conformed dimensional object 414b (which in one embodiment contains both dimension objects 412c and 412d, while in another embodiment contains one of the dimension objects 412c or 412d, but not both) to be pulled into conformed dimensional data gravity well 416. Note further that conformed dimensional data gravity well 416 is depicted as being larger than conformed dimensional data gravity well 410, since there are more conformed dimensional objects (418) in conformed dimensional data gravity well 416 than there are in conformed dimensional data gravity well 410.

Note that, in one embodiment, the conformed dimensional data gravity wells depicted in FIG. 4 can be viewed as dimensional relationship density wells. That is, the conformed dimensional data gravity wells have a certain density of objects, which is due to a combination of how many objects have been pulled into a particular well as well as the weighting assigned to the objects, as described herein.

Note that in one embodiment, it is the quantity of conformed dimensional objects that have been pulled into a particular conformed dimensional data gravity well that determines the size and shape of that particular conformed dimensional data gravity well. That is, the fact that conformed dimensional data gravity well 416 has two dimension objects 412c-412d while conformed dimensional data gravity well 410 has only one dimension object 412b has no bearing on the relatively larger size of conformed dimensional data gravity well 416. Rather, the size and shape of conformed dimensional data gravity well 416 in this embodiment is based solely on the quantity of conformed dimensional objects such as parsed conformed dimensional object 414b (each of which contain dimension objects 412c-412d) that are pulled into conformed dimensional data gravity well 416. For example, conformed dimensional data gravity well 420 has a single dimension object 412e, just as conformed dimensional data gravity well 410 has a single dimension object 412b. However, because conformed dimensional data gravity well 420 is populated with only one parsed conformed dimensional object 414c, it is depicted as being smaller than conformed dimensional data gravity well 410, which is populated with four conformed dimensional objects 408 (e.g., four instances of the parsed conformed dimensional object 414a).

In one embodiment, the conformed dimensional data gravity well frameworks and/or conformed dimensional data gravity wells described in FIG. 4 are graphical representations of 1) sorting logic and 2) data storage logic that is part of CDDGWL 148 shown in FIG. 1. That is, the conformed dimensional data gravity well frameworks define the criteria that are used to pull a particular parsed conformed dimensional object into a particular conformed dimensional data gravity well, while the conformed dimensional data gravity wells depict the quantity of parsed conformed dimensional objects that have been pulled into a particular conformed dimensional data gravity well. Note that in one embodiment, the original object from the stream of parsed conformed dimensional objects 310 goes into an appropriate conformed dimensional data gravity well, with no copy of the original being made. In another embodiment, a copy of the original object from the stream of parsed conformed dimensional objects 310 goes into an appropriate conformed dimensional data gravity well, while the original object continues to its original destination (e.g., a server that keeps a database of inventory of items at a particular store). In another embodiment, the original object from the stream of parsed conformed dimensional objects 310 goes into an appropriate conformed dimensional data gravity well, while the copy of the original object continues to its original destination (e.g., a server that keeps a database of inventory of items at a particular store).

Figure 5:
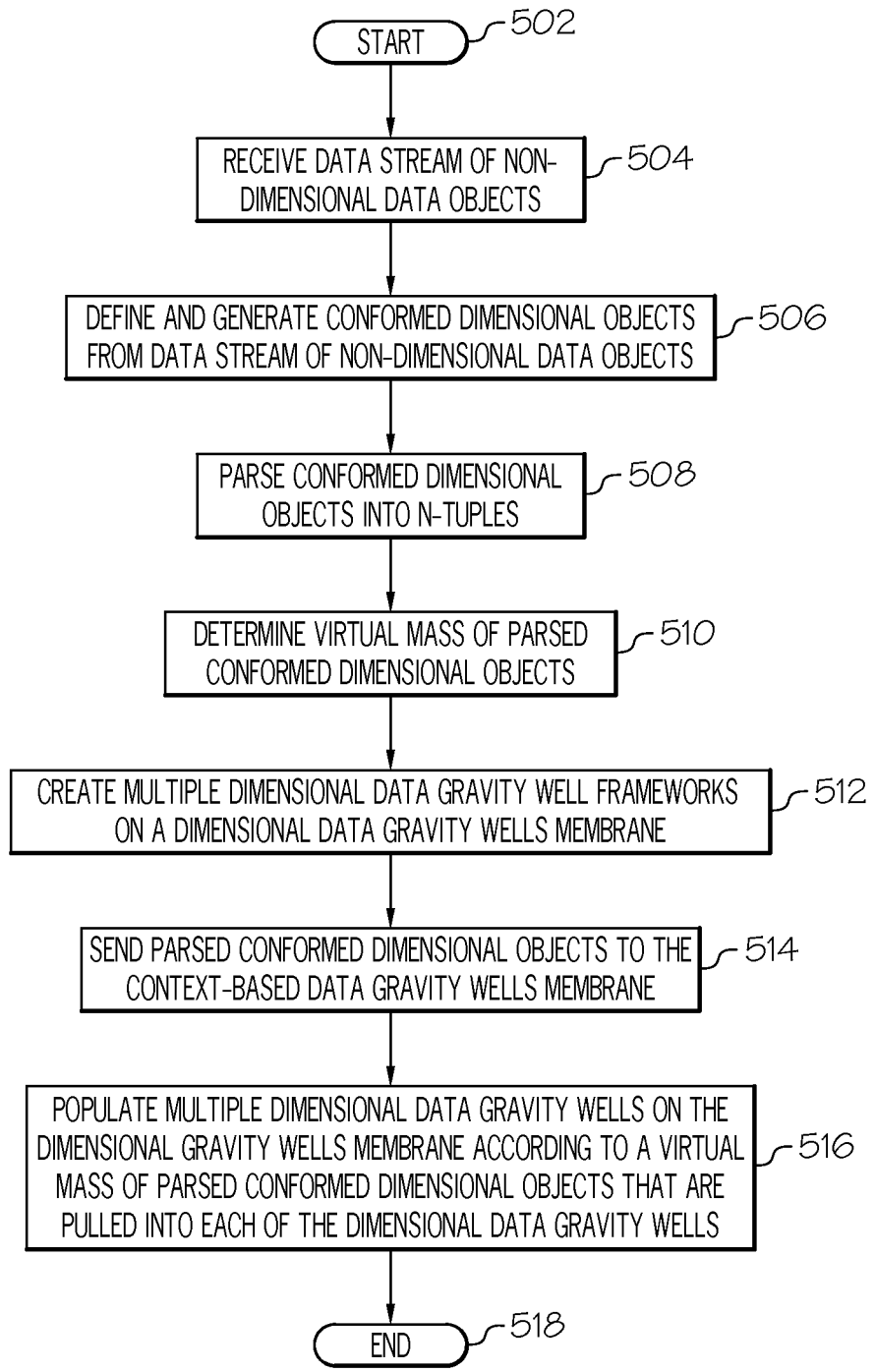
FIG. 5 is a high-level flow chart of one or more steps performed by a processor to define multiple dimensional data gravity wells on a dimensional data gravity well membrane.

With reference now to FIG. 5, a high-level flow chart of one or more steps performed by a processor to define multiple conformed dimensional data gravity wells on a conformed dimensional data gravity well membrane is presented. After initiator block 502, a data stream (e.g., element 302 in FIG. 3) of non-dimensional data objects is received by a processor (block 504). As described herein, each of the non-dimensional data objects describes an alphanumeric value that is dimensionless, and thus does not by itself describe a quantity of an item, or in some embodiments, even the item itself. As described in block 506, the processor then applies a dimension object to each of the non-dimensional data objects, in order to define and generate conformed dimensional objects from the data stream of non-dimensional data objects. As described herein (e.g., see FIG. 2 above), the dimension object provides a dimension that provides a meaningful dimension to each of the non-dimensional data objects.

As depicted in block 508, the processor parses the conformed dimensional object into an n-tuple. Each n-tuple comprises a pointer to one of the non-dimensional data objects (e.g., element 214*a* shown in FIG. 2), a probability that a non-dimensional data object has been associated with a correct dimension object (see block 510 below), and a weighting factor of importance of the conformed dimensional object (see FIG. 3 above). In one embodiment, the n-tuple also includes a probability that a particular non-dimensional data object is uncorrupted. For example, if it is determined that a particular non-dimensional data object is a fragment of an original data object (e.g., by comparing the length, format, and other features of that non-dimensional data object with known lengths, formats, and other features of data coming from the same data source as that particular non-dimensional data object), then a probability can be assessed as to whether that particular non-dimensional data object is corrupted. For example, if a particular non-dimensional data object from "Source A" is 32 characters long, while a typical (e.g., 90% of the non-dimensional data objects from Source A) non-dimension data object from Source A is 30 characters long, then it is likely (e.g., 80% probable) that this particular non-dimensional data object has been corrupted with additional data. Similarly, if a particular non-dimensional data object from Source A is 22 characters long, while a typical (e.g., 99% of the non-dimensional data objects from Source A) non-dimension data object from Source A is 30 characters long, then it is likely (e.g., 99% probable) that this particular non-dimensional data object has been corrupted by having certain bits truncated/removed.

With respect to block 510, the processor calculates a virtual mass of each of the parsed conformed dimensional objects. In one embodiment, the virtual mass of the parsed conformed dimensional object is derived from a formula $P(C) \times Wt(S)$, where $P(C)$ is the probability that 1) a particular non-dimensional data object has been associated with the correct dimensional label, 2) that same particular non-dimensional data object is uncorrupted, and 3) that same non-dimensional data object has come from a data source whose data has been predetermined to be appropriate for storage in a particular dimensional data gravity well. The probabilities of 1) and 2) occurring are discussed above. The probability of 3) occurring can be predetermined by assigning one or more flags or other markers to each of the dimensional data gravity wells. For example, assume that these flags/markers identify five characteristics (e.g., length of the data, format of the data, time/date of when the data is generated, how frequently identical data is generated, and a source type (e.g., point of sales stations, stored databases, websites, etc.) of the data) of data that will be accepted in a particular dimensional data gravity well. If a certain non-dimensional data object has four of these flags/markers (e.g., as part of its n-tuple), then there may be a 90% probability that this non-dimensional data object is appropriate for storage within the particular dimensional data gravity well that has the five flags/markers. However, if a certain non-dimensional data object has only three of these flags/markers (e.g., as part of its n-tuple), then there may be only a 50% probability that this non-dimensional data object is appropriate for storage within that same particular dimensional data gravity well.

Continuing with the formula $P(C) \times Wt(S)$, $Wt(S)$ is the weighting factor of importance of the conformed dimensional object (see the narrative description of FIG. 3 above). As described herein, in one embodiment the weighting factor of importance of the conformed dimensional object is based on how important the conformed dimensional object is to a particular project.

As described in block 512, the processor creates multiple conformed dimensional data gravity well frameworks on a conformed dimensional data gravity wells membrane. Each of the multiple conformed dimensional data gravity well frameworks comprises at least one dimension object. As described herein, the conformed dimensional data gravity wells membrane is a virtual mathematical membrane that is capable of supporting multiple conformed dimensional data gravity wells (see FIG. 4 above).

As described in block 514, multiple parsed conformed dimensional objects are then transmitted to the conformed dimensional data gravity wells membrane. That is, these parsed conformed dimensional objects are then transmitted to an algorithmic environment in which the logic-enabled conformed dimensional data gravity well frameworks exist. These conformed dimensional data gravity well frameworks are algorithmically generated based on their ability to attract specific conformed dimensional objects. As described in block 516, this pulling/attraction enables the processor to define multiple conformed dimensional data gravity wells according to the virtual mass of multiple parsed conformed dimensional objects that are pulled into each of the conformed dimensional data gravity well frameworks. As described herein, each of the multiple parsed conformed dimensional objects is pulled into a particular conformed dimensional data gravity well in response to values from its n-tuple matching at least one dimensional object, and/or other probability factors described herein, that is part of the particular conformed dimensional data gravity well.

In one embodiment, the generated conformed dimensional data gravity wells are presented on a display according to a combined virtual mass of the multiple parsed conformed dimensional objects that populate each conformed dimensional data gravity well (see FIG.4 above). That is, a first conformed dimensional data gravity well that holds a more virtually massive combination of parsed conformed dimensional objects than a second conformed dimensional data gravity well will be larger, and thus is visually depicted on a display as extending farther away from the conformed dimensional data gravity wells membrane than the second conformed dimensional data gravity well.

In one embodiment, the construction of the conformed dimensional data gravity wells is temporally dynamic. That is, in this embodiment, the processor determines an age (i.e., how "stale" or "old") each of the multiple parsed conformed dimensional objects that have been pulled into the particular conformed dimensional data gravity well is. Based on the age of each of these objects, the processor removes, from the particular conformed dimensional data gravity well that holds a stale object, any parsed conformed dimensional object that is older than a predetermined age.

In one embodiment, a determination of a likelihood that a particular conformed dimensional object is pulled into an appropriate conformed dimensional data gravity well is performed using a Bayesian probability formula. That is, an appropriate conformed dimensional data gravity well is defined as a conformed dimensional data gravity well whose framework includes at least one non-conformed dimensional object and at least one dimension object found in a conformed dimensional object that is pulled into that particular (appropriate) conformed dimensional data gravity well.

For example, in order to determine a likelihood that a particular conformed dimensional object is pulled into an appropriate conformed dimensional data gravity well, assume that A represents the event that a particular conformed dimensional object is a good populator of a particular conformed dimensional data gravity well, and B represents the event that the particular conformed dimensional object has a predefined amount of conformed dimension objects applied to its non-dimensional data object. This results in the Bayesian probability formula of:

$$P(A \mid B) = \frac{P(B \mid A)P(A)}{P(B)}$$

where:
P(A|B) is the probability that a dimension object will be an appropriate populator of a particular dimensional data gravity well (A) given that (|) a predefined amount of dimension objects are applied to the non-dimensional data object in a conformed dimensional object (B);
P(B|A) is the probability that the predefined amount of dimension objects are applied to the non-dimensional data object in the conformed dimensional object (B) given that (|) the conformed dimensional object is assigned to the particular dimensional data gravity well (A);
P(A) is the probability that the particular conformed dimensional object will be the appropriate populator of the particular dimensional data gravity well regardless of any other information; and
P(B) is the probability that the particular conformed dimensional object will have the predefined amount of dimension objects regardless of any other information.

For example, assume that nine out of ten of the conformed dimensional objects that populate a particular conformed dimensional data gravity well have the predefined amount (e.g., 80%) of the dimension objects that are on the sides of the particular conformed dimensional data gravity well (e.g., elements 210x-210z in FIG. 2). Thus, P(B|A)=9/10=0.90. Assume also that the odds that any conformed dimensional object will be an appropriate populator of a particular conformed dimensional data gravity well, regardless of any other information (P(A)), is 0.20, and that the probability that any conformed dimensional object will have the predefined amount of dimension objects regardless of any other information (P(B)) is 0.25. The probability that any one conformed dimensional object will be a good populator of a particular dimensional data gravity well (based on these parameters) is 72%:

$$P(A \mid B) = \frac{.90 * .20}{.25} = .72$$

However, if nine out of ten of the conformed dimensional objects that populate a particular conformed dimensional data gravity well still have the predefined amount (e.g., 80%) of the dimension objects that are on the sides of the particular conformed dimensional data gravity well (P(B|A)=9/10=0.90), but now the odds that any conformed dimensional object will be an appropriate populator of a particular conformed dimensional data gravity well, regardless of any other information (P(A)), is 25%, and the probability that any conformed dimensional object will have the predefined amount of dimension objects regardless of any other information (P(B)) is now 23%, then the probability that any one conformed dimensional object will be a good populator of a particular conformed dimensional data gravity well (based on these new parameters) is 98%:

$$P(A \mid B) = \frac{.90 * .25}{.23} = .98$$

The process depicted in FIG. 5 ends at terminator block 518.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Note further that any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A processor-implemented method of defining multiple conformed dimensional data gravity wells on a conformed dimensional data gravity wells membrane, the processor-implemented method comprising:
receiving, by a processor, a data stream of non-dimensional data objects;
applying, by the processor, a dimension object to one of the non-dimensional data objects to define a conformed dimensional object;
parsing, by the processor, the conformed dimensional object into an n-tuple, wherein the n-tuple comprises a pointer to said one of the non-dimensional data objects, a probability that said one of the non-dimensional data objects has been associated with a correct dimensional label, a probability that said one of the non-dimensional data objects is uncorrupted, and a weighting factor of importance of the conformed dimensional object;
calculating, by the processor, a virtual mass of a parsed conformed dimensional object, wherein the virtual mass of the parsed conformed dimensional object is derived from a formula of:

P(C)×Wt(S), where P(C) is the probability that 1) said one of the non-dimensional data objects has been associated with the correct dimensional label, 2) said one of the non-dimensional data objects is uncorrupted, and 3) the said one of the non-dimensional data objects has come from a data source whose data has been predetermined to be appropriate for storage in a particular dimensional data gravity well; and where Wt(S) is the weighting factor of importance of the conformed dimensional object;
creating, by the processor, multiple dimensional data gravity well frameworks on a conformed dimensional data gravity wells membrane, wherein each of the multiple dimensional data gravity well frameworks comprises at least one dimension object, and wherein the conformed dimensional data gravity wells membrane is a virtual mathematical membrane that is capable of supporting multiple dimensional data gravity wells;
transmitting, by the processor, multiple parsed conformed dimensional objects as a streaming data flow to the conformed dimensional data gravity wells membrane;
defining, by the processor, multiple conformed dimensional data gravity wells according to the virtual mass of multiple parsed conformed dimensional objects that are pulled into each of the dimensional data gravity well frameworks; and
sorting, by one or more processors, the multiple parsed conformed dimensional objects from the streaming data flow by selectively pulling each of the multiple parsed conformed dimensional objects into the particular dimensional data gravity well in response to values from its n-tuple matching said at least one dimension object in said particular dimensional data gravity well.

2. The processor-implemented method of claim 1, further comprising:
graphically displaying the multiple dimensional data gravity wells according to a combined virtual mass of the multiple parsed conformed dimensional objects, wherein a first dimensional data gravity well holds a more virtually massive combination of parsed conformed dimensional objects than a second dimensional data gravity well, and wherein the first dimensional data gravity well extends farther away from the dimensional data gravity wells membrane than the second dimensional data gravity well.

3. The processor-implemented method of claim 1, further comprising:
determining, by the processor, a likelihood that a particular conformed dimensional object is pulled into an appropriate dimensional data gravity well according to a Bayesian probability formula of:

$$P(A \mid B) = \frac{P(B \mid A)P(A)}{P(B)}$$

where:
P(A|B) is the probability that a dimension object will be an appropriate populator of a particular dimensional data gravity well (A) given that (|) a predefined amount of dimension objects are applied to the non-dimensional data object in a conformed dimensional object (B);
P(B|A) is the probability that the predefined amount of dimension objects are applied to the non-dimensional data object in the conformed dimensional object (B) given that (|) the conformed dimensional object is assigned to the particular dimensional data gravity well (A);
P(A) is the probability that the particular conformed dimensional object will be the appropriate populator of the particular dimensional data gravity well regardless of any other information; and
P(B) is the probability that the particular conformed dimensional object will have the predefined amount of dimension objects regardless of any other information.

4. The processor-implemented method of claim 1, wherein the weighting factor of importance of the conformed dimensional object is based on how important the conformed dimensional object is to a particular project.

5. The processor-implemented method of claim 1, further comprising:
determining that said one of the non-dimensional data objects is uncorrupted by determining that said one of the non-dimensional data objects is not a fragment of an original data object.

6. The processor-implemented method of claim 1, further comprising:
graphically representing, by the processor, said at least one dimension object on a wall of said particular dimensional data gravity well.

7. The processor-implemented method of claim 1, further comprising:
determining, by the processor, an age of each of the multiple parsed conformed dimensional objects that have been pulled into the particular dimensional data gravity well; and removing from the particular dimensional data gravity well any parsed conformed dimensional object that is older than a predetermined age.

8. A computer program product for defining multiple dimensional data gravity wells on a dimensional data gravity wells membrane, the computer program product comprising a non-transitory computer readable storage medium having program code embodied therewith, the program code readable and executable by a processor to perform a method comprising:

receiving a data stream of non-dimensional data objects;
applying a dimension object to one of the non-dimensional data objects to define a conformed dimensional object;
parsing the conformed dimensional object into an n-tuple, wherein the n-tuple comprises a pointer to said one of the non-dimensional data objects, a probability that said one of the non-dimensional data objects has been associated with a correct dimensional label, a probability that said one of the non-dimensional data objects is uncorrupted, and a weighting factor of importance of the conformed dimensional object;
calculating a virtual mass of a parsed conformed dimensional object, wherein the virtual mass of the parsed conformed dimensional object is derived from a formula of:

$P(C) \times Wt(S)$, where P(C) is the probability that 1) said one of the non-dimensional data objects has been associated with the correct dimensional label, 2) said one of the non-dimensional data objects is uncorrupted, and 3) the said one of the non-dimensional data objects has come from a data source whose data has been predetermined to be appropriate for storage in a particular dimensional data gravity well; and where Wt(S) is the weighting factor of importance of the conformed dimensional object;
creating multiple dimensional data gravity well frameworks on a conformed dimensional data gravity wells membrane, wherein each of the multiple dimensional data gravity well frameworks comprises at least one dimension object, and wherein the conformed dimensional data gravity wells membrane is a virtual mathematical membrane that is capable of supporting multiple dimensional data gravity wells;
transmitting multiple parsed conformed dimensional objects as a streaming data flow to the conformed dimensional data gravity wells membrane;
defining multiple conformed dimensional data gravity wells according to the virtual mass of multiple parsed conformed dimensional objects that are pulled into each of the dimensional data gravity well frameworks; and
sorting the multiple parsed conformed dimensional objects from the streaming data flow by selectively pulling each of the multiple parsed conformed dimensional objects into the particular dimensional data gravity well in response to values from its n-tuple matching said at least one dimension object in said particular dimensional data gravity well.

9. The computer program product of claim 8, further comprising program code that is readable and executable by the processor to:
graphically display the multiple dimensional data gravity wells according to a combined virtual mass of the multiple parsed conformed dimensional objects, wherein a first dimensional data gravity well holds a more virtually massive combination of parsed conformed dimensional objects than a second dimensional data gravity well, and wherein the first dimensional data gravity well extends farther away from the dimensional data gravity wells membrane than the second dimensional data gravity well.

10. The computer program product of claim 8, further comprising program code that is readable and executable by the processor to:
determine a likelihood that a particular conformed dimensional object is pulled into an appropriate dimensional data gravity well according to a Bayesian probability formula of:

$$P(A \mid B) = \frac{P(B \mid A)P(A)}{P(B)}$$

where:
P(A|B) is the probability that a dimension object will be an appropriate populator of a particular dimensional data gravity well (A) given that (|) a predefined amount of dimension objects are applied to the non-dimensional data object in a conformed dimensional object (B);
P(B|A) is the probability that the predefined amount of dimension objects are applied to the non-dimensional data object in the conformed dimensional object (B) given that (|) the conformed dimensional object is assigned to the particular dimensional data gravity well (A);
P(A) is the probability that the particular conformed dimensional object will be the appropriate populator of the particular dimensional data gravity well regardless of any other information; and
P(B) is the probability that the particular conformed dimensional object will have the predefined amount of dimension objects regardless of any other information.

11. The computer program product of claim 8, wherein the weighting factor of importance of the conformed dimensional object is based on how important the conformed dimensional object is to a particular project.

12. The computer program product of claim 8, further comprising program code that is readable and executable by the processor to:
determining that said one of the non-dimensional data objects is uncorrupted by determining that said one of the non-dimensional data objects is not a fragment of an original data object.

13. The computer program product of claim 8, further comprising program code that is readable and executable by the processor to:
graphically represent said at least one dimension object on a wall of said particular dimensional data gravity well.

14. The computer program product of claim 8, further comprising program code that is readable and executable by the processor to:
determine an age of each of the multiple parsed conformed dimensional objects that have been pulled into the particular dimensional data gravity well; and
remove from the particular dimensional data gravity well any parsed conformed dimensional object that is older than a predetermined age.

15. A computer system comprising:
a processor, a computer readable memory, and a computer readable storage medium;
first program instructions to receive a data stream of non-dimensional data objects;

second program instructions to apply a dimension object to one of the non-dimensional data objects to define a conformed dimensional object;

third program instructions to parse the conformed dimensional object into an n-tuple, wherein the n-tuple comprises a pointer to said one of the non-dimensional data objects, a probability that said one of the non-dimensional data objects has been associated with a correct dimensional label, a probability that said one of the non-dimensional data objects is uncorrupted, and a weighting factor of importance of the conformed dimensional object;

fourth program instructions to calculate a virtual mass of a parsed conformed dimensional object, wherein the virtual mass of the parsed conformed dimensional object is derived from a formula of:

$$P(C) \times Wt(S),$$

where P(C) is the probability that 1) said one of the non-dimensional data objects has been associated with the correct dimensional label, 2) said one of the non-dimensional data objects is uncorrupted, and 3) the said one of the non-dimensional data objects has come from a data source whose data has been predetermined to be appropriate for storage in a particular dimensional data gravity well; and where Wt(S) is the weighting factor of importance of the conformed dimensional object;

fifth program instructions to create multiple dimensional data gravity well frameworks on a conformed dimensional data gravity wells membrane, wherein each of the multiple dimensional data gravity well frameworks comprises at least one dimension object, and wherein the conformed dimensional data gravity wells membrane is a virtual mathematical membrane that is capable of supporting multiple dimensional data gravity wells;

sixth program instructions to transmit multiple parsed conformed dimensional objects as a streaming data flow to the conformed dimensional data gravity wells membrane;

seventh program instructions to define multiple dimensional data gravity wells according to the virtual mass of multiple parsed conformed dimensional objects that are pulled into each of the dimensional data gravity well frameworks; and eighth program instructions to sort the multiple parsed conformed dimensional objects from the streaming data flow by selectively pulling each of the multiple parsed conformed dimensional objects into the particular dimensional data gravity well in response to values from its n-tuple matching said at least one dimension object in said particular dimensional data gravity well; and wherein the first, second, third, fourth, fifth, sixth, seventh, and eighth program instructions are stored on the computer readable storage medium for execution by the processor via the computer readable memory.

16. The computer system of claim 15, further comprising:
ninth program instructions to graphically display the multiple dimensional data gravity wells according to a combined mass of the multiple parsed conformed dimensional objects, wherein a first dimensional data gravity well holds a more massive combination of parsed conformed dimensional objects than a second dimensional data gravity well, and wherein the first dimensional data gravity well extends farther away from the dimensional data gravity wells membrane than the second dimensional data gravity well; and wherein the ninth program instructions are stored on the computer readable storage medium for execution by the processor via the computer readable memory.

17. The computer system of claim 15, further comprising:
ninth program instructions to determine a likelihood that a particular conformed dimensional object is pulled into an appropriate dimensional data gravity well according to a Bayesian probability formula of:

$$P(A \mid B) = \frac{P(B \mid A)P(A)}{P(B)}$$

where:
P(A|B) is the probability that a dimension object will be an appropriate populator of a particular dimensional data gravity well (A) given that (|) a predefined amount of dimension objects are applied to the non-dimensional data object in a conformed dimensional object (B);

P(B|A) is the probability that the predefined amount of dimension objects are applied to the non-dimensional data object in the conformed dimensional object (B) given that (|) the conformed dimensional object is assigned to the particular dimensional data gravity well (A);

P(A) is the probability that the particular conformed dimensional object will be the appropriate populator of the particular dimensional data gravity well regardless of any other information; and P(B) is the probability that the particular conformed dimensional object will have the predefined amount of dimension objects regardless of any other information; and wherein the ninth program instructions are stored on the computer readable storage medium for execution by the processor via the computer readable memory.

18. The computer system of claim 15, further comprising:
ninth program instructions to determine that said one of the non-dimensional data objects is uncorrupted by determining that said one of the non-dimensional data objects is not a fragment of an original data object; and wherein the ninth program instructions are stored on the computer readable storage medium for execution by the processor via the computer readable memory.

19. The computer system of claim 15, further comprising:
ninth program instructions to graphically represent said at least one dimension object on a wall of said particular dimensional data gravity well; and wherein the ninth program instructions are stored on the computer readable storage medium for execution by the processor via the computer readable memory.

20. The computer system of claim 15, further comprising:
ninth program instructions to determine an age of each of the multiple parsed conformed dimensional objects that have been pulled into the particular dimensional data gravity well; and tenth program instructions to remove from the particular dimensional data gravity well any parsed conformed dimensional object that is older than a predetermined age; and wherein the ninth and tenth program instructions are stored on the computer readable storage medium for execution by the processor via the computer readable memory.

* * * * *